United States Patent [19]

Cheney

[11] Patent Number: 5,484,092
[45] Date of Patent: Jan. 16, 1996

[54] VEHICLE STORAGE BOX WITH DOUBLE SECURED COMPARTMENTS

[76] Inventor: Dale S. Cheney, 2679 W. 1700 South, Syracuse, Utah 84075

[21] Appl. No.: 222,676

[22] Filed: Apr. 4, 1994

Related U.S. Application Data

[63] Continuation-in-part of Ser. No. 7,274, Jan. 21, 1993, Pat. No. 5,299,722.

[51] Int. Cl.[6] .................................................. B60R 9/00
[52] U.S. Cl. ..................... 224/404; 206/317; 220/522; 312/902; 312/222; 70/63; 70/159; 70/160; 70/DIG. 63; 224/282
[58] Field of Search .......................... 224/42.03 A, 42.42, 224/273, 282, 309, 315, 328, 913, 402–404; 206/315.11, 317.523; 220/210, 522, 525, 526; 70/63, 159–162, DIG. 63; 312/222, 291, 298, 902; 296/37.1, 37.6

[56] References Cited

U.S. PATENT DOCUMENTS

| | | | |
|---|---|---|---|
| 750,817 | 2/1904 | Crenshaw | 206/317 |
| 784,601 | 3/1905 | Taylor | 206/317 |
| 1,859,228 | 5/1932 | Berry | 206/31.511 X |
| 2,501,270 | 12/1946 | Fleming | 206/315.11 |
| 2,541,890 | 2/1951 | Schaperkotter et al. | 220/522 X |
| 2,641,520 | 6/1953 | Moore | 312/291 |
| 2,823,971 | 2/1958 | Hoyt | 312/222 X |
| 3,165,225 | 3/1963 | Reitzel | 220/343 |
| 3,777,882 | 12/1973 | McIntyre | 206/372 |
| 3,926,308 | 12/1975 | Sullivan | 206/223 |
| 3,967,869 | 7/1976 | Jackson | 312/902 X |
| 4,136,904 | 1/1979 | Lauderdale | 296/37.1 |
| 4,240,240 | 12/1980 | Cohen | 206/523 X |
| 4,423,812 | 1/1984 | Sato | 220/522 X |
| 4,524,496 | 6/1985 | Tehsildar et al. | 220/335 |
| 4,531,774 | 7/1985 | Whatley | 296/37.6 |
| 4,697,379 | 10/1987 | McPhaul | 43/54.1 |
| 4,809,897 | 3/1989 | Wright, Jr. | 224/282 |
| 4,821,882 | 4/1989 | Messina | 206/523 X |
| 4,878,706 | 11/1989 | Novikov | 296/37.1 |
| 4,928,865 | 5/1990 | Lorence et al. | 224/275 |
| 4,936,624 | 6/1990 | West | 296/37.6 |
| 4,967,944 | 11/1990 | Waters | 224/273 |
| 5,004,103 | 4/1991 | Connors et al. | 206/372 |
| 5,080,250 | 1/1992 | Dickinson et al. | 220/335 |
| 5,088,636 | 2/1992 | Barajas | 224/281 |
| 5,271,499 | 12/1993 | Van Horssen | 206/523 X |

FOREIGN PATENT DOCUMENTS

| | | | |
|---|---|---|---|
| 59036 | 5/1980 | Japan | 224/282 |
| 4328045 | 11/1992 | Japan | 224/273 |
| 9002061 | 3/1990 | WIPO | 224/277 |

*Primary Examiner*—J. Casimer Jacyna
*Attorney, Agent, or Firm*—Thrope, North & Western

[57] ABSTRACT

Disclosed is a truck storage box comprising a rectangular box arranged for mounting in a standard pickup truck bed to extend thereacross and includes an two independent storage compartments, a first larger storage compartment and a second smaller storage compartment which is locked within the interior of the first storage compartment. The structures are preferably formed of steel, or like materials. The second storage compartment is particularly adapted for holding elongated, flat articles such as tools, guns, fishing rods or other appropriate items. In some instances, the second storage compartment is hinged to the interior of the lid of the larger storage compartment and the second storage compartment can be accessed only when the first storage compartment is opened and when the second storage compartment is unlocked.

14 Claims, 6 Drawing Sheets

VEHICLE STORAGE BOX WITH DOUBLE SECURED COMPARTMENTS

RELATED APPLICATION

This application is a continuation-in-part of prior U.S. patent application Ser. No. 08/007,274, filed Jan. 21, 1993, entitled Double Lid Truck Storage Box, now U.S. Pat. No. 5,299,722.

THE FIELD OF THE INVENTION

The invention relates to utility containers, that are preferably metallic, for providing a storage of items, such as tools and sporting goods, and arranged for mounting into the bed of a standard pickup truck.

BACKGROUND ART

There is an acute need in the industry to provide container and box arrangements to store and hold articles in a pickup truck bed. For example, U.S. Pat. Nos. to Whatley, No. 4,531,774; to West, 4,936,624; and to Waters, 4,967,944, show just a few of the proposed schemes for pickup truck mounted boxes and associated mounting structures.

The theft of valuable articles from vehicles is an ever increasing reality of modern life. Thieves are particularly attracted to certain types of valuable articles. For example, many persons desire to keep sporting good articles, such as rifles, shotguns, and fishing rods, in a vehicle at all times ready for use. Such sporting goods are particularly attractive targets for thieves and, due to their elongated size, cannot be effectively hidden (for example by covering with clothing), in a vehicle which does not have a securable trunk space.

The need for providing secure storage in a pick up truck, or other vehicle without a truck space, is recognized in the art. Even further, U.S. Pat. No. 4,809,897 to Wright provides a lockable storage compartment for use in a vehicle cab; thus recognizing the need for secure storage even inside a locked vehicle compartment. Disadvantageously, the Wright reference is unusable for storage of elongated, generally flat sporting goods such as rifles and fishing gear. Also, the device disclosed in the Wright reference does not effectively protect articles from damage due to impacts and provides inadequate protection from the weather if it were ever mounted exterior of the vehicle cab.

Disadvantageously, the previously available storage devices provide inadequate security from theft, do not sufficiently protect valuable articles from damage, and/or are inconvenient to use. In view of the forgoing, it would be an advance in the art to provide a vehicle mounted storage box with a secured compartment for holding and protecting valuable sporting goods and other such articles from theft and damage and which is convenient to use.

BRIEF SUMMARY AND OBJECTS OF THE INVENTION

It is a principal object of the present invention to provide a storage box which can be carried in a vehicle and wherein articles can be securely stored.

It is another object of the present invention to provide a vehicle storage box which particularly stores and secures elongated, substantially flat objects, such as rifles, shotguns, fishing rods and reels, tools (such as levels and other elongated hand tools), and other similar articles.

It is a further object of the present invention to provide a vehicle storage box which provides increased security from theft and damage for valuable articles.

Still another object of the present invention is to provide a vehicle storage box which camouflages the presence of a secured compartment holding valuable articles.

Yet another object of the present invention is to provide a vehicle storage box which requires a thief to break through both first and second independent locking mechanisms in order to enter a secured compartment wherein valuable articles are held.

In accordance with one aspect of the present invention, a vehicle storage box for securely holding articles in a vehicle to prevent the theft or damage thereof is provided. The vehicle storage box preferably comprises a first compartment means for holding articles and a second compartment means for holding articles. In one presently preferred embodiment, the first compartment means comprises a box having a pivotally connected lid. The second compartment means comprises a tray which has a first position wherein the tray is held against the interior surface of the lid to form the second compartment and a second position moved away from the interior of the lid. Locking means are provided to lock the lid in its closed position and to lock the tray against the interior surface of the lid or other interior surface of the box. When the first compartment formed by the lid and the box is locked closed, and when the second compartment formed by the tray and the interior surface of the lid is locked in its closed position, valuable articles can be securely held safe from theft and damage.

In some preferred embodiments, the second compartment is entirely contained and concealed within the first compartment requiring that the locking mechanisms to both the first compartment and the second compartment must be broken in order to steal the articles held in the second compartment. The second compartment is particularly adapted for holding elongated, generally flat sporting goods articles, such as rifles, shotguns, fishing rods, and hand tools.

In accordance with another aspect of the present invention, a double lid truck storage box is provided which includes a rectangular box of a length to fit between the side walls of a conventional pickup truck bed. The box is arranged to be mounted in pickup truck bed forward end, adjacent to the truck cab, utilizing bolt type fasteners, or the like, that are fitted through the box bottom and pickup truck bed, and the box may include wing sections that extend across the pickup truck side walls. The box may have an open interior or include rails for supporting a tray or trays, and can be utilized to hold tools, food, fishing or hunting supplies, or the like.

In one embodiment of the present invention, the double lid is for closing the open top of the rectangular box and consists of a narrow top lid that is fitted over a wide lower lid. The wide lower lid is formed as a rectangle with equal height parallel long side walls with parallel short end walls with a flat bottom panel fitted thereacross, forming an open center area. The top lid is hinge connected, as with a piano type hinge, or the like, to the top edge of the lower lid long side wall, the top lid to pivot back towards the pickup truck cab, providing access to the lower lid interior. The lower lid, in turn, is hinge connected, preferably utilizing a roller type hinge, or the like, to a top edge of the box long wall, immediately below and juxtaposition to, the top lid hinge, which lid roller hinge connection provides for displacing the lid away from the truck cab as it is pivoted to an open attitude. The lower lid forward displacement allows it to be swung fully off of the box open area without interfering with the front wall of the pickup truck bed or the back of the pickup truck cab.

The storage box end wing portions and the ends of the double lid stack, preferably extend beyond the box ends, across the truck sides. The top lid and lower lid each include a separate arrangement lock for individually securing, respectively, the top lid to the lower lid, and the lower lid to the box. The lower lid to maintain within it, items, such as guns, tools, or the like, and may include one or more layers of cushioning material fitted therein where holes may be cut to accommodate an item or items stored therein. Each top lid and lower lid may also include a light or lights with switches for illuminating items contained, respectively, in the lower lid and box.

BRIEF DESCRIPTION OF THE DRAWINGS

These and other object and features of the invention will become more apparent from the following description in which the invention is described in detail in conjunction with the accompanying drawings.

DETAILED DESCRIPTION OF THE PREFERRED EMBODIMENTS

Figure 6:
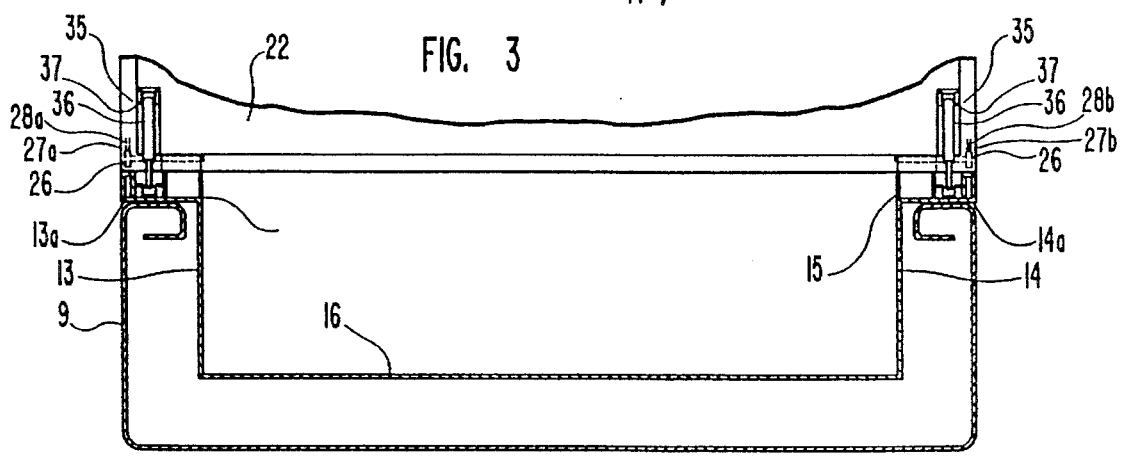
FIG. 6 is an end sectional view taken along the line 6—6 of FIG. 5.

Reference will first be made to FIGS. 1–7 to describe one preferred embodiment of the present invention. One preferred embodiment of the present invention will be referred to as a double lid truck storage box 10 and is generally shown best in FIGS. 1, 3, 4 and 5. Illustrated in FIGS. 1, 3, 4 and 5 is a box generally designated at 10. Box 10 is preferably formed of a heavy durable material such as steel and is for fitting in a forward end of a pickup truck bed 9, as shown in FIG. 6. To fit in pickup truck bed, the box 10 preferably has essentially a rectangular shape with long front and rear sides 11 and 12, respectively, and short left and right ends 13 and 14, respectively, with a flat bottom 16. The box short ends 13 and 14 are each stepped outwardly across a point 15 above the middle, and then upwardly, to align with the box top edges, forming, as shown best in FIG. 6, wing sections 13a and 14a. As shown, the wing sections 13a and 14a extend over the tops of the pickup truck bed 9 sides, the wing section end opposite faces aligning with the truck sides. The box 10 may be empty or, as shown best in FIG. 3, may include a tray 17, or trays with outturned lip edges 18 for fitting over the top edges of the front and rear sides 11 and 12, supporting the tray above the box bottom 16.

Figure 3:
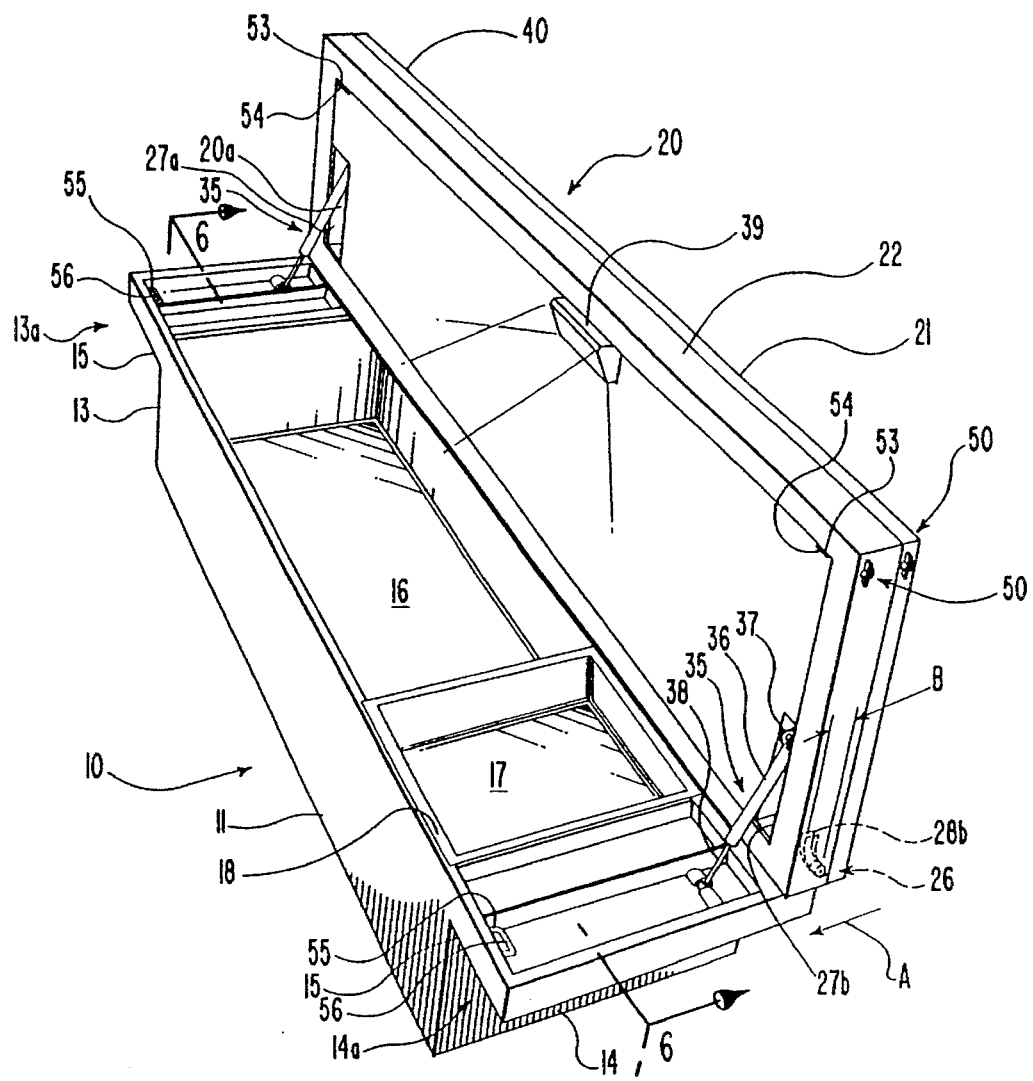
FIG. 3 is a view like FIG. 1 except showing the top lid locked to the lower lid that has been pivoted around a roller hinge coupling to the box, showing the box interior with a tray fitted therein.
Figure 7:
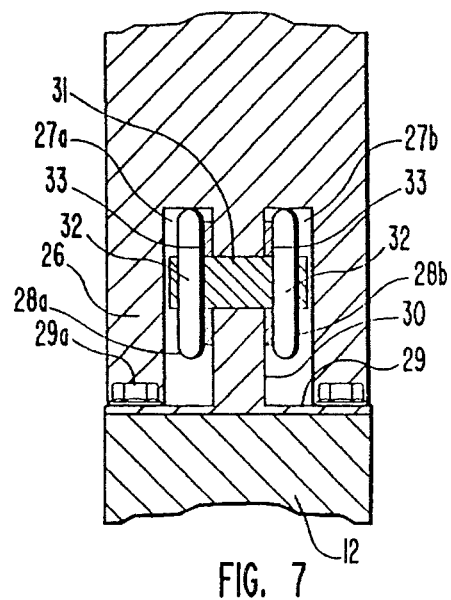
FIG. 7 is an enlarged sectional view taken within the line 7—7 of FIG. 6, showing one of the pair of roller hinges mounted to the storage box top edge and supported in a track mounted in the lid.

The box 10 open top area is covered over by a double lid 20. The double lid 20 includes a top lid 21 and lower lid 22. Shown in broken lines in FIG. 4, the top lid 21 lower edge of a rear side 23 is connected at hinge 24, to an upper edge of lower lid 22 rear side 25 that is shown herein as a piano type hinge. Though, it should be understood, other types of hinges could also be utilized as described within the scope of this disclosure. The lower lid 22 rear side 25, along its lower edge, is, in turn, connected by a pair of identical roller hinges 26 to a box rear side 12 top edge. The roller hinges 26, as shown best in FIGS. 3 and 7, are each positioned in a lid compartment 27a and 27b, respectively, with the rollers 32 thereof arranged in arcuate tracts 28a and 28b, respectively, shown also in broken lines in FIGS. 1, 3 and 6. The lid 22 of the invention is of a height for providing a storage area therein suitable for storing narrow, substantially flat items, and, accordingly, the pair of roller hinges 26 are provided for displacing the lower lid towards the box front side 12 when it is lifted around its hinge mount to the box rear side 11 top edge. Which lower lid displacement moves the lid rear side 11 and hinge connected top lid rear side 23 away from the truck bed forward end and truck cab allowing the lower lid 22 and top lid 21 to be pivoted to a fully opened attitude, moving as illustrated by arrow A in FIG. 3.

The roller hinges 26, as shown best in FIG. 7, includes a base plate 29 that is rigidly secured by bolt type fasteners 29a to extend at right angle upwardly from the box rear side 11 top edge and mounts, at a right angle, a standard 30 that extends upwardly from the base plate center. The standard 30, in turn, mounts an axle 31 secured across its top end, the standard and axle forming a cross. The axle 31 mounts, to each end, a roller 32 journaled thereon. The pair of rollers 32 are journaled in side by side relationship, and each is contained between a backing plate 33, and a washer with a cotter pin, not show, fitted across an axle end. Though, it should be understood, one roller 32 could be mounted to an end of an axle 31 that extends across standard 30, within the scope of this disclosure.

Figure 1:
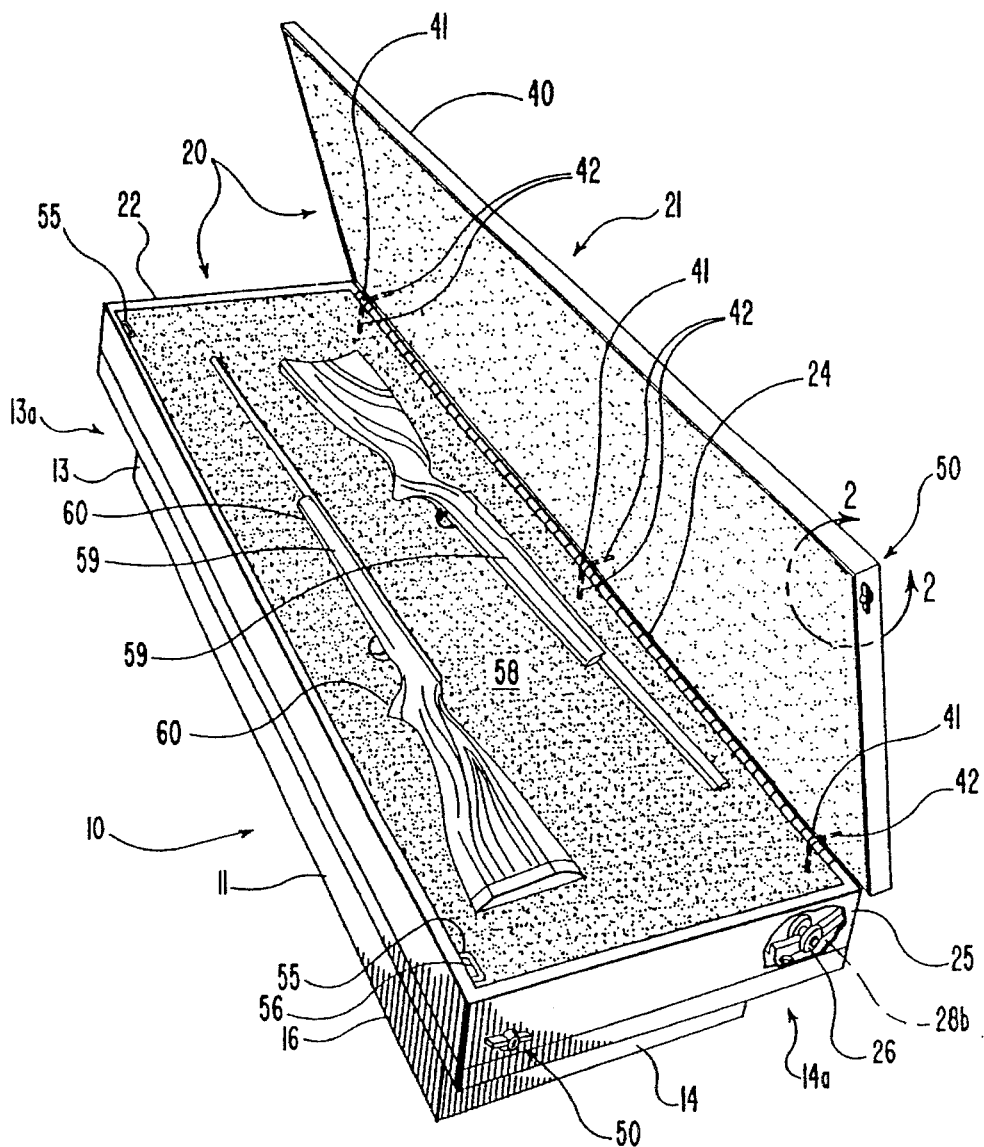
FIG. 1 is a perspective view of one embodiment of the present invention showing a top lid pivoted around a hinge coupling to a lower lid, and showing the lower lid as containing a cushioning material wherein holes have been formed that are silhouettes of two rifles, with rifles shown fitted into which holes.
Figure 4:
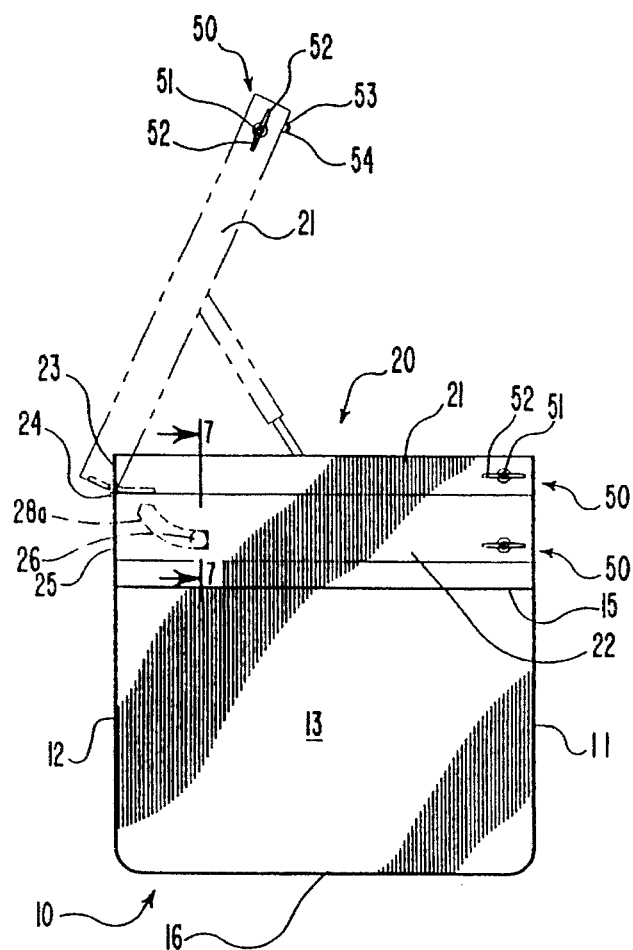
FIG. 4 is a left side elevation view of the double lid truck storage box of FIG. 1, only showing the open top lid in broken lines.

The side by side rollers 32 are maintained, in pairs of arcuate tracts 28a and 28b, respectively, the curve of which arcuate tracks is illustrated in broken lines in FIGS. 1, 3 and 4. The arcuate tracks 28a and 28b provide surfaces for the pair of rollers 32 to travel on during lid lifting, and are open centrally to allow for passage of the standard 30 therealong. When the lid 22 is in a closed attitude, covering the box 10 open top, each roller hinge 26, as shown best in FIG. 4, is positioned at a forward end of the arcuate tracks 28a and 28b. Whereas, when the lid 22 has been pivoted off of the box 10 top area, as shown best in FIG. 3, the roller hinge 26 will have moved to a rear end of the arcuate tracks 28a and 28b. The lid 22 is thereby displaced forward, as illustrated by arrow A in FIG. 3. The spacing distance between the roller 32 axles at their limits of travel in the arcuate tracks 28a and 28b is the distance that the lid is displaced forward. For supporting the lower lid 22 in its open attitude, as shown best in FIG. 3, at least one ram 35, but preferably a pair, are fitted between the lower lid under surface and box, one each adjacent to each lower lid end.

As shown in FIG. 3, each ram 35 is connected between the lower lid compartments 27a and 27b, and the box wing sections 13a and 14a, respectively. Each ram 35 includes an actuator housing 36 that is pivotally connected on a top end 37 into the lower lid compartment 27a or 27b, and includes an actuator rod 38 extending outwardly from the actuator other end. The actuator rod 38, in turn, is pivotally connected across the floor of the wing sections 13a or 14a. Each ram 35 is preferably pneumatic though, it should be understood, it could by hydraulic, and is arranged to provide a resistance to the actuator rod 38 travel as it is pulled out of the actuator body 36 as the lower lid 22 is lifted. Each ram 35 functions to support the lower lid in its elevated attitude, as shown in FIG. 3. Preferably, the lower lid 22 includes a light 39 mounted therein that is connected electrically to the vehicle battery or to a separate battery, to be turned on manually, or when the lid is lifted to the attitude shown in FIG. 3.

Figure 5:
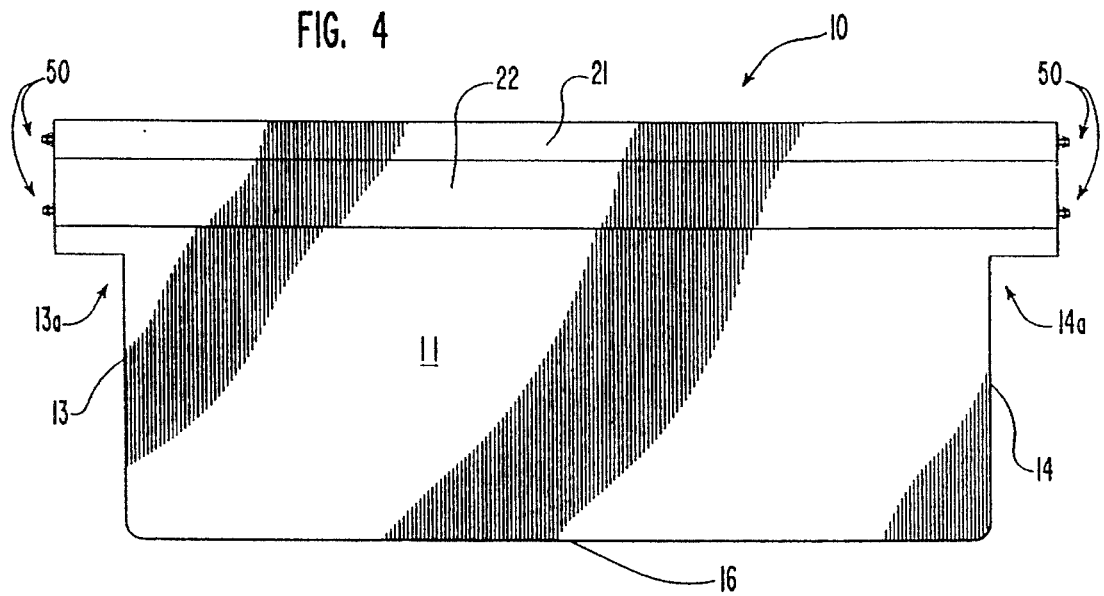
FIG. 5 is a front elevation view of the double lid truck storage box of FIG. 1 only showing the top lid as having been closed and locked over the lower lid.

The top lid 21, as set out above and as shown best in FIG. 1, is connected at hinge 24, that is preferably a piano type hinge, to the lower lid 22 rear side 23 upper edge, juxtaposition to the lower lid roller hinge 26 connection to box 10. In the embodiment of FIGS. 1–7, the top lid 21 opening is thereby independent of the lower lid 22 and is opened by release of a lock, as set out hereinbelow, and the lifting of a top edge of a lid forward side 40. To assist in top lid 21 lifting and for supporting the top lid in its lifted attitude, as shown in FIG. 1, sear springs 41 are preferably fitted, at spaced intervals, along the hinge 24. The sear springs 41 are arranged such that sear spring legs 42 are relaxed when the top lid 21 is in an erected attitude, as shown in FIG. 1 and in broken lines in FIG. 4. The sear spring legs 42 are moved to be essentially in alignment with one another, loading each sear spring 41, as the top lid is closed, as illustrated in FIGS. 3, 4 and 5. Upon release of a top lid lock, as described below, the sear spring legs 42 tend to move apart, assisting in lifting the top lid 21 off from lower lid 22. Further, sear springs 41 tend also to maintain the top lid in its lifted attitude, until an operator applies a force to lower the top lid into covering attitude over the lower lid 22 top open area.

Figure 2A:
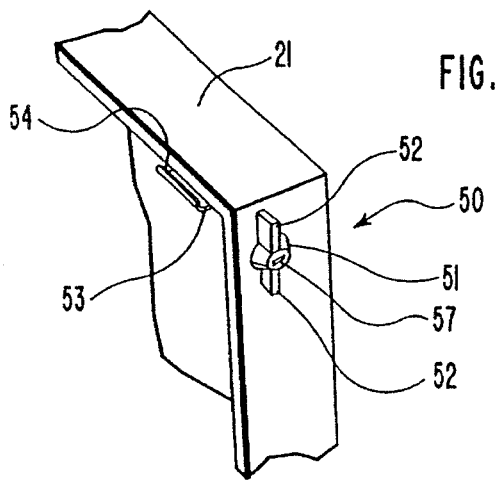
FIG. 2A is an expanded sectional view taken within the line 2—2 of FIG. 1, showing a top lid lock in a locked attitude.
Figure 2B:
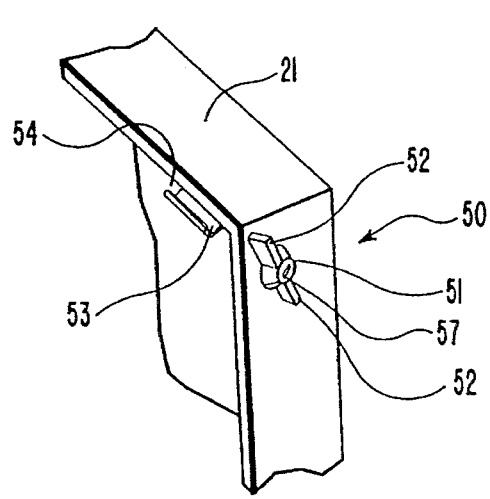
FIG. 2B is a view like FIG. 2A only showing the top lid lock in an unlocked attitude.

Lock arrangements are preferably provided for separately locking the top lid 21 to the lower lid 22 and the lower lid 22 to the box 10, respectively. A hook lock 50 is shown in FIGS. 1, 2A and 2B, as a preferred lock arrangement for both top and lower lids of the embodiment illustrated in FIGS. 1–7. Though, it should be understood, a number of locks, such as a vending machine type lock, or a movable bar arrangement where a bar end is moved by operation of the lock tumbler cylinder under a lip or tab, could be used within the scope of this disclosure.

Hook lock 50, as shown best in FIGS. 2A and 2B, includes a spindle 51 that is mounted to and extends outwardly from opposite lid ends. Each spindle 51 includes a pair of oppositely extending wings 52 for gripping by an operator to turn the spindle and a pivotally connected bar 53. The bar 53 is shown as a section of a sheet stock material with a hook end 54 formed across a leading edge. The bar hook end 54 is adapted fitting into and locking to a bar 56 of a latch bar 55, shown in FIG. 1, that extends inwardly from the lower lid 22 forward side, for securing the top lid 21 onto the lower lid 22. Turning the spindle 51 through approximately one eighth of a turn, as shown in FIG. 2B pivots the bar 53 from a parallel attitude, shown in FIG. 2A, relative to the plane of the top lid 21 front face, displacing the bar hook end 54 out of engagement with the hook end 56 of the latch bar 55 and releasing the top lid 21 from the lower lid 22. Locking of the spindle bar hook end 54 to the bar 56 is the reverse of the above described procedure. Spindle 51 turning is provided by turning the spindle wings 52 by a user, not shown, who turns the spindle 51 back to the attitude shown in FIG. 2A to lock the top lid 21 onto the lower lid 22. For locking the spindle 51 in place a keyway 57, that is shown best in FIGS. 2A and 2B, is provided for receiving a key, not shown, that is fitted therein for turning to enable or disable spindle 51 turning, thereby controlling access into the lower lid 22 and/or box 10.

The same lock 50 for interaction with latch bar 55, as shown herein, is preferably utilized for locking the top lid 21 to the lower lid 22 and lock the lower lid 22 to box 10. It should, however, be understood that different arrangements of locks could be so used within the scope of this disclosure.

As set out above, the lower lid 22 is formed to have an open internal area for storing items therein. For supporting and protecting such stored items, FIG. 1 shows the lid 22 open area as optionally containing a sheet of a cushioning material 58 that is shown supporting two rifles 59 nested therein. Which cushioning material 58 is shown as having silhouette type openings of each rifle 59 cut therein, and the cut sections removed for receiving each of the rifles 59, within the scope of this disclosure. Of course, the lid could be arranged to contain items other than rifles 59. For example, a pistol or pistols, hand tools, fishing gear or the like (not shown) could be stored in lower lid 22 with the silhouettes of such item or items cut into the cushioning material 58, or the cushioning material omitted within the scope of this disclosure.

Reference will now be made to FIGS. 8–12 which illustrate another embodiment of the present invention generally designated at 110. The embodiment of FIGS. 8–12 provides advantages not heretofore available in the art. The embodiment of FIGS. 8–12 provides secure storage for valuable articles while protecting articles from damage due to impact or exposure to weather. The described embodiment provides these security and protection functions while being more convenient to use than previously available devices.

The embodiment 110 includes a first storage compartment (generally designated at 111 in FIG. 10) which is partially defined by a box 112. The box 112 is generally rectangular and is particularly adapted to fit between the side walls of a conventional pickup truck bed. Those skilled in the art will appreciate that the box 112 can be fabricated from any number of materials having appropriate characteristics, such as strength and resistance to adverse weather. The box 112 is provided with wing sections 114 which can extend over the tops of the pickup truck bed sides (as represented at 9 in FIG. 6). Moreover, the shape of the box 112 can be adapted for whatever end use is desired and the items mentioned earlier in connection with FIGS. 1–7 should be considered pertinent when arriving at additional embodiment of the invention.

The embodiments of the present invention are particularly adapted to be used in a pickup truck bed but may advantageously be used in other locations in a vehicle, both exterior and interior. When used herein, the term "in the vehicle" is intended to refer to any location associated with a vehicle, e.g., in a truck cab, in a pickup truck bed, or any other position on a vehicle. In particular, when used in the interior of a locked vehicle, the present invention provides a great deterrence to a thief since not only must the vehicle be broken into but two independently locked compartments provided in the embodiment of FIGS. 8–12 must also be broken into, as will be explained shortly, for the thief to achieve success. While not explicitly illustrated, structures can be provided to secure the box 112 to the vehicle (not illustrated in FIGS. 8–12). Otherwise, the weight and bulk of the box 112 keeps the box 112 in place in the vehicle and prevents theft thereof.

The box 112 is provided with a lid 116. The lid 116 functions to enclose the box 112 to form a first storage compartment having an interior surface and an exterior surface. The lid 116 is connected to the box 112 via a hinge 124. As explained in connection with the embodiment of Figs. 1–7, the hinge 124 is preferably a piano-type hinge which provides strength and dependable operation. The shape of the lid 116 is preferably one which provides a recess in the interior of the lid but many other shapes can also be used. The box 112 and the lid 116 is just one presently preferred example of a compartment means within the scope of the present invention and other equivalent structures can also function as a compartment means.

Figure 8:
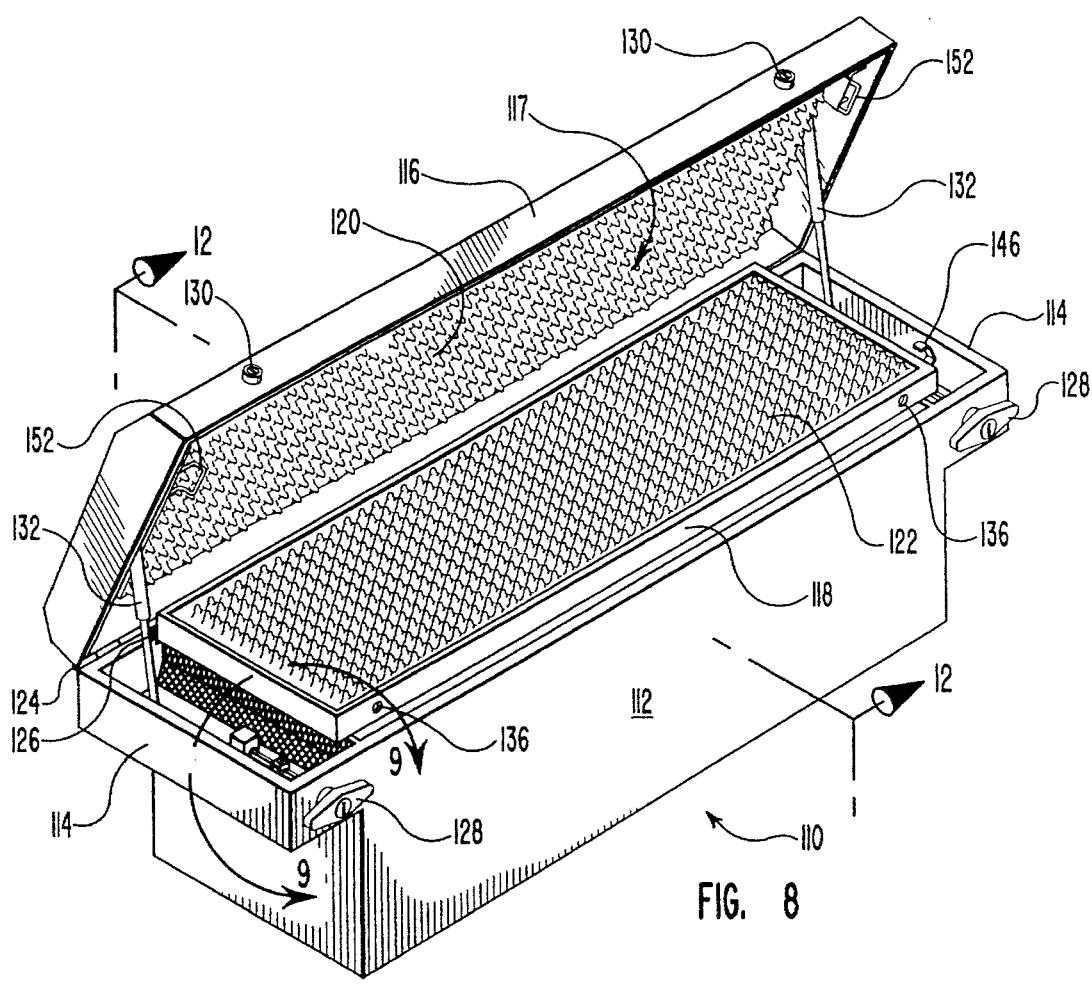
FIG. 8 is a perspective view of another embodiment of the present invention.

Still referring to FIG. 8, the lid 116 opens and closes over the top of the box 112 and can be locked in a closed position by rotating the double wing handles 128 which are connected to other locking structures as will be explained further shortly. The lid 116 is held in an open position as shown in FIG. 8 by rams 132 which are known in the art and function similarly to rams 35 which are represented in Figs. 3 and 4. The rams 132 also function to dampen the closing of the lid 116.

Also represented in FIG. 8 is a tray 118 which, in cooperation with the interior surface of the lid 116, functions to form another, second storage compartment. With the tray 118 in the position shown in FIG. 8, the interior of the second storage compartment is open to the surrounding environment. As will be explained fully shortly, the tray 118 can be locked against one of the interior surfaces of the first storage compartment, e.g., the lid 116 of the box 112, to form a secured storage compartment (the second storage compartment being generally designated at 117 in FIG. 8). The tray 118 and the lid 116, along with associated structures, comprise another presently preferred example of a compartment means and it is within the scope of the present invention to utilize other structures carrying out similar or equivalent functions as a compartment means.

The interior surface of the lid 116 and the interior surface of the tray 118 are provided with a cushioning material 120 and 122, respectively, to further protect the articles stored therein from impact damage. The illustrated "egg crate" cushioning material is preferred but other materials can also be used. While the cushioning material can be recessed to provide receptacles for particular articles, it is presently preferred to merely place the articles on the unrecessed cushioning material to securely hold all sizes and shapes of generally elongated, flat objects.

The shape and size of the tray 118 can be selected to accommodate whatever particular articles are to be stored therein. Importantly, the size of the tray 118 should be large enough to hold valuable articles which cannot otherwise be hidden or camouflaged in a vehicle. For example, tools which are two feet long or longer cannot often be effectively hidden in the cab of a pick-up truck. Moreover, rifles, shotguns, and fishing rods are typically well over three feet in length and cannot be effectively hidden in a vehicle, particularly in a cab of a pick-up truck. Furthermore, articles such as rifles and shotguns are generally at least six inches high from the top of the barrel to the bottom of the trigger guard, and a rifle equipped with a "scope" may be eight inches high or higher.

In order to accommodate these valuable articles, the tray 118, which generally defines the size of the second storage compartment, preferably has a length of at least two feet and a width of at least six inches which allow storage of shorter valuable articles such as pistols and tools. More preferably, the tray 118 has a length of at least about three feet and a width of at least about six inches which allows secure storage of valuable sporting good articles such as rifles and fishing rods wherein such articles can be laid flat on the cushioning material 122. Even more preferably, the tray 118 has a length of at least about four feet and a width of at least about twelve inches which will accommodate an even wider variety of rifles, shotguns, and fishing gear. It is to be appreciated that while rifles, shotguns, and fishing rods are the articles which are most likely to be stored in the secured, second compartment of the embodiments of the present invention, the present invention can be adapted to store any number of different sizes and types of articles.

Still referring to FIG. 8, the tray 118 is connected to the lid 116 by way of a hinge 126. The hinge 126 can preferably be a piano-type hinge as hereinbefore described or another type of hinge or equivalent structure can be used. Only an end of the hinge 126 is visible in FIG. 1 with the hinge 126 being visible in the cross sectional views of Figs. 10–12.

The lid 116 is locked in its closed position using a hook lock arrangement similar to that represented in FIGS. 1 and 2. As explained before, while a number of locks can be used, the herein describe hook lock arrangement is preferred. As shown best in FIG. 9, a spindle 140 passes through a side of the wall of the box 112, connects to the handle 128, and is supported by a bushing 138 so that the shaft rotates. The opposite end of the spindle 140 is rotatably supported by a post 150.

An arm 142 extends from the spindle 140 and a rod (not clearly illustrated) is pivotally connected to the free end of the arm 142 by way of a bolt 144. The rod is connected to a similar arm and spindle arrangement connected to the other handle 128, both of which can be seen in FIG. 8. The arrangement is structured so that when both handles 128 are unlocked and only one handle 128 is rotated, the other handle will also rotate allowing the lid 116 to be opened. This feature is particularly advantageous when the embodiment 110 is installed in the bed of pick-up truck. If desired, the user can leave both handles 128 rotated to the closed position, but left unlocked, so that the lid 116 can be opened from either side of the box 112 and eight side of the pick-up truck (see FIG. 6). Alternatively, rotating either of the handles 128 to the closed position and locking either of the handles locks the storage compartment in the closed position. Further, if additional security is desired, both handles can be locked; thus both locks would need to be broken for a thief to gain access to the first storage compartment.

Figure 9:
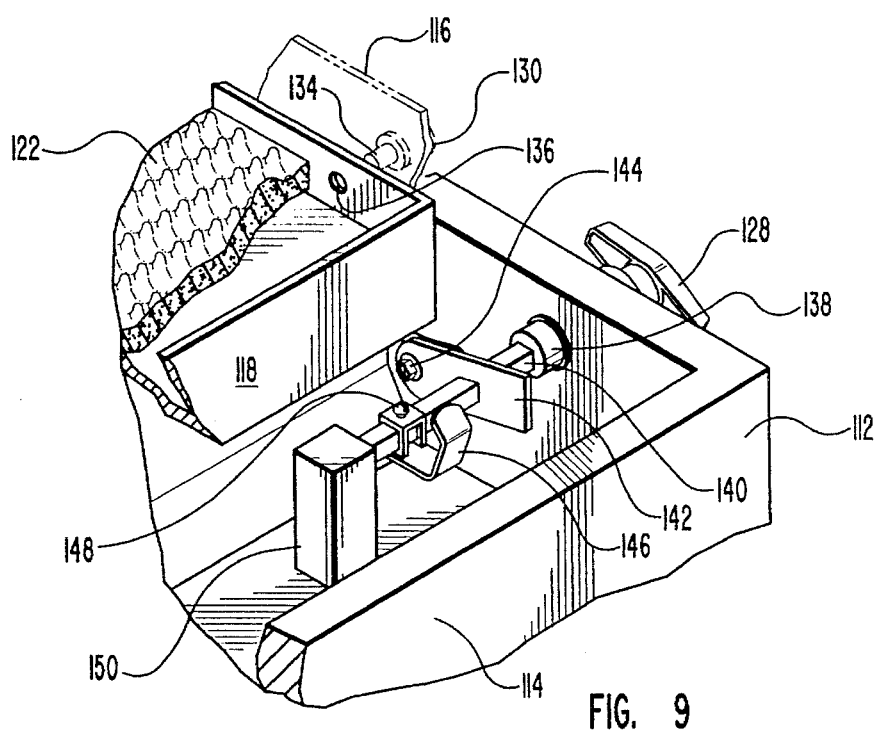
FIG. 9 is a partial perspective view of taken along line 9—9 of FIG. 8.
Figure 10:
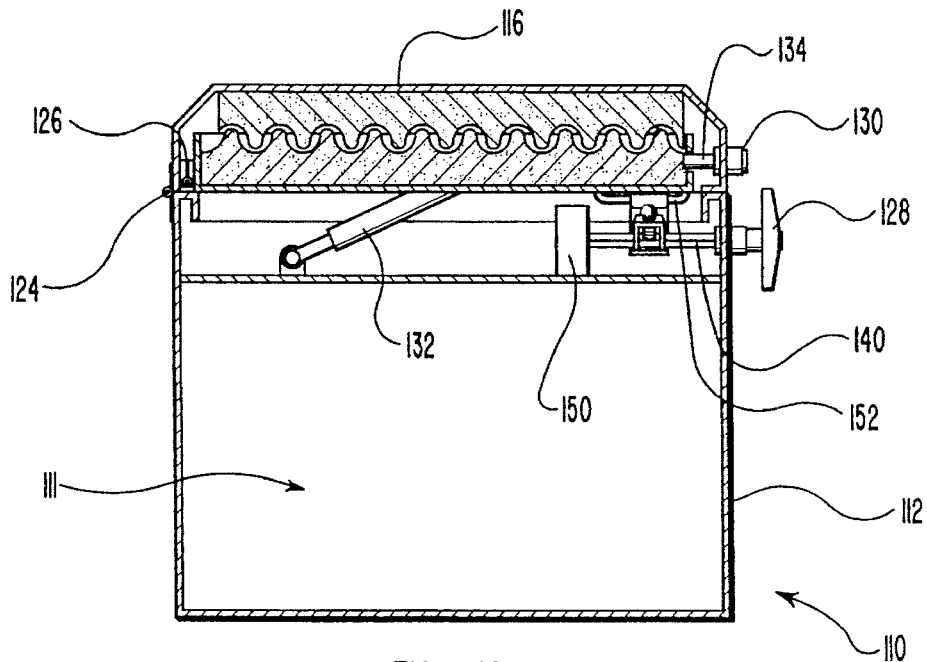
FIG. 10 is an elevated cross sectional view of the embodiment illustrated in FIG. 8 with the interior of the larger storage compartment being shown in its closed position.

Referring now to both FIGS. 9 and 10, each spindle 140 includes a hook 146 which is held in place on the spindle with a screw 148. The ends of the hooks 146 fit into the rigid loops 152 provided on the interior of the lid 116. When the lid 116 is in its closed position, and the handles 128 have been rotated to their closed positions with both handles 128 being locked, the lid 116 and the box 112 form a secure first storage compartment which is very resistant to entry by thieves.

Referring next to FIG. 10, a cross sectional view of the embodiment 110 with both the first storage compartment 111 (formed by the box 112 and the lid 116) and the second storage compartment 117 (formed by the tray 118 and the lid 116) in their closed positions is provided. With both the first storage compartment 111 and the second storage compartment 117 being locked unauthorized entry into either compartment is prevented.

As shown in FIGS. 8–10, the tray 118 is held against the interior surface of the lid 116 to form a second or secured compartment by studs, one of which is illustrated at 134 in FIG. 9 in its retracted position, which extend from push button locks 130 represented in FIG. 1. Referring particularly to FIG. 9, the stud 134 is aligned with a bore 136 provided in the tray 118. When the stud 134 of the push button lock 130 is extended into the bore 136, as shown in the cross sectional views of FIGS. 10 and 11, the tray 118 is held securely against the interior surface of the lid 116.

As will be appreciated by an examination of FIG. 10, with both the push button locks 130 engaged, and hooks 146 engaged into the loops 152, a thief must break open the lid 116 and then break into the second compartment 117 formed by the tray 118 an the lid 116, in order to gain access to any articles stored therein. Moreover, the presence of the second storage compartment 117 formed by the tray 118 and the lid 116 is not explicitly apparent to an unwary potential thief. Even if a thief is aware of the presence of the second storage compartment 117, the difficulty of obtaining access thereto is a substantial deterrence to any attempted break-in. Thus, placement of articles in the second storage compartment formed by the tray 118 and the lid 116 provides more security for the articles than previously available schemes.

Figure 11:
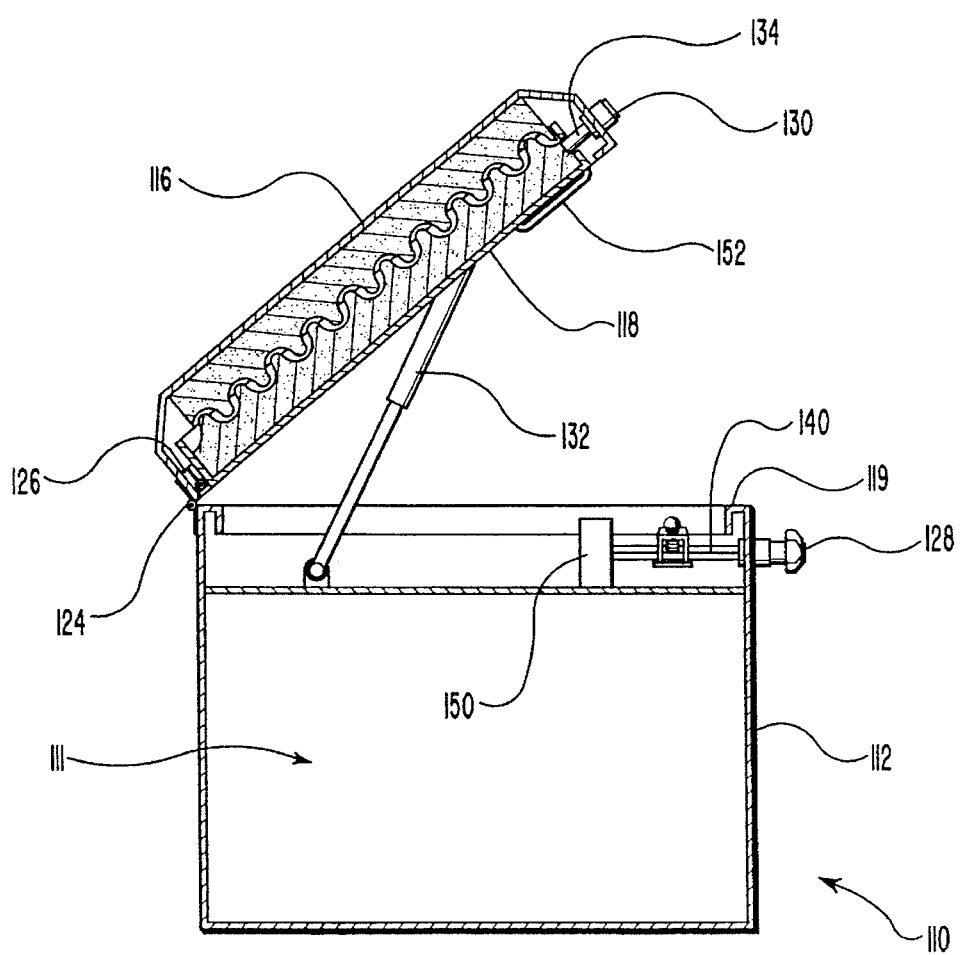
FIG. 11 is an elevated cross sectional view of the embodiment illustrated in FIG. 8 with the interior of the larger storage compartment being shown in its open position.

Furthermore, the embodiment 110 provides more convenience for the user than other structures used to store elongated, flat sporting good articles such as rifles and fishing rods. As can be seen in FIG. 11, when access to only the larger first storage compartment 111 is desired, the stud 134 of the push button lock 130 is left in its extended orientation engaging the bore (136 in FIG. 9) in the tray 118. In this way, when the lid 116 is lifted to gain access to the first storage compartment, the tray 118 remains in position against the interior surface of the lid 116 and the second storage compartment formed thereby is lifted out of the way of the first storage compartment. This convenient feature of the present invention is in contrast to those schemes for securing rifles and other sporting good articles in a vehicle which are so cumbersome and unwieldy that the user often forgoes use of such schemes.

Figure 12:
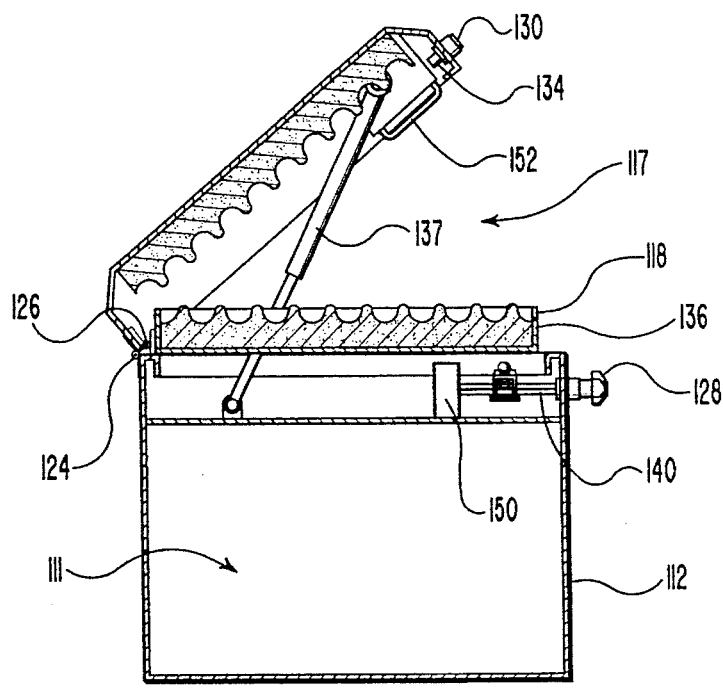
FIG. 12 is an elevated cross sectional view of the embodiment illustrated in FIG. 8, taken along line 12—12 of FIG. 8, with the secured compartment being shown in its open position.

Referring now particularly to FIG. 12, when access to the second, or secured, storage compartment 117 is desired, the push button locks 130 are released so that the studs 134 retract from the bore 136 in the tray 118 and the lid 116 is moved to its raised position as shown in FIG. 12. The tray 118 remains in place (supported by a ledge 119) and swung away from the interior side of the lid 116 as the lid is lifted and the user has easy access to the articles stored in the secured compartment. The ledge 119 also functions to prevent access to the studs 134 of the push button locks 130 when the second storage compartment 117 is in its closed position. Advantageously, the embodiments of the present invention can provide a larger first storage compartment 111 and a second smaller storage compartment 117 wherein the second storage compartment 117 is not provided at the sacrifice of the size or convenient use of the first storage compartment 111.

Figure 13:
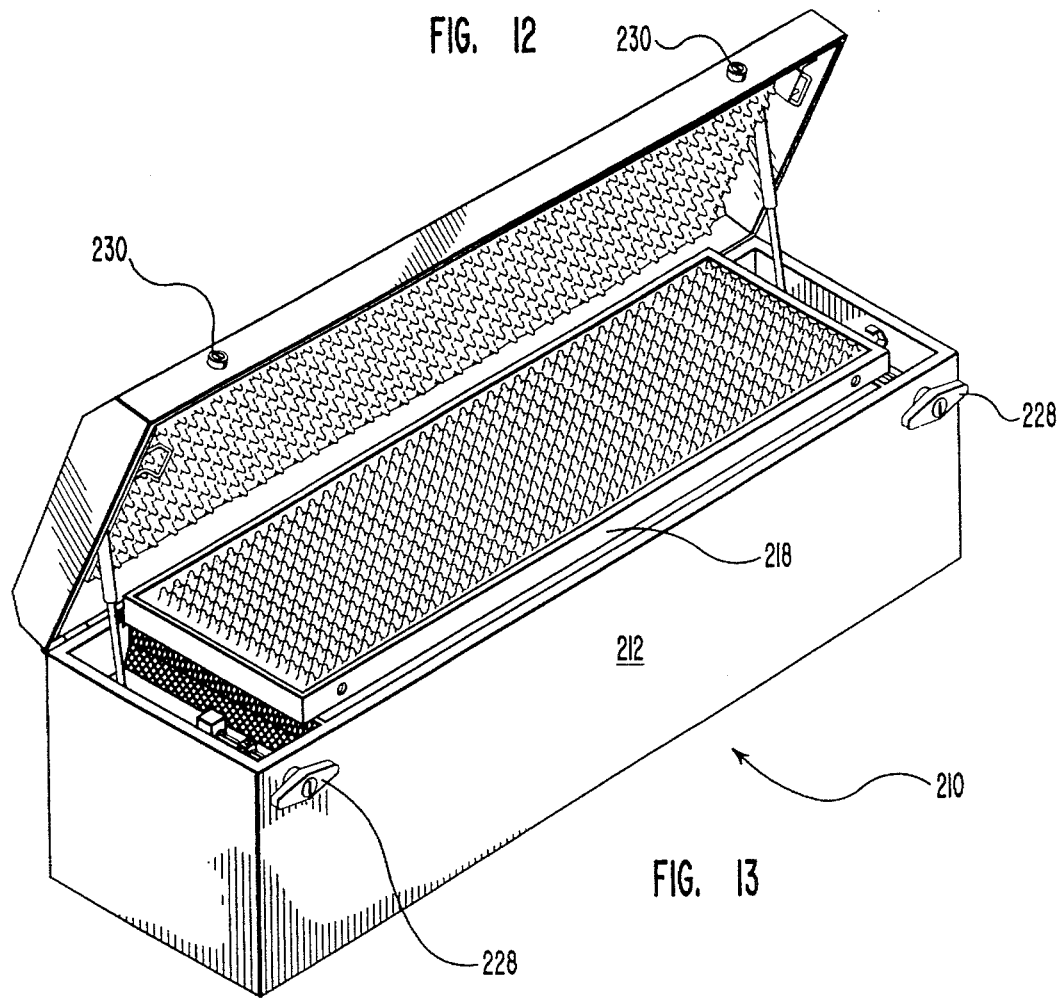
FIG. 13 is a perspective view of yet another embodiment of the present invention.

Reference will next be made to FIG. 13 which provides a perspective view of another embodiment of the present invention generally designated at 210, which provides essentially all of the features and advantages of the embodiment 110 illustrated in FIGS. 8–12. Similarly to the earlier described embodiment, the embodiment 210 includes a box 212, a lid 216, and a tray 218 with locking structures 228 and 230. The embodiment 210 is particularly intended for use inside the cab of a truck or other vehicle and thus may be smaller, if desired, than the earlier described embodiments. It will be appreciated that the structures of embodiment 210 function in a similar manner to earlier described corresponding structures.

It is to be understood that the features and structures described in connection with the embodiment of FIGS. 1–7 can also be included in the embodiments represented in FIGS. 8–13.

From the forgoing, it will be appreciated that the present invention provides a storage box which can be carried in a vehicle and wherein valuable articles, such as rifles, shotguns, fishing rods and reels, and other similar sporting goods, can be securely stored. The present invention also provides increased security from theft and damage for valuable articles which are often stored in vehicles and provides a vehicle storage box which camouflages the presence of a secured compartment holding such valuable articles. The present invention further provides a vehicle storage box which requires a thief to break through both a first and a second locking arrangement in order to enter a secured compartment wherein valuable articles are held. The present invention also provides a structure for securely storing valuable articles in a vehicle which is more convenient to use than previously available devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A vehicle storage box for securing articles in a vehicle, the storage box comprising:

first compartment means for holding articles, the first compartment means comprising an interior surface and an exterior surface, the first compartment means having a length greater than three feet and a height greater than six inches;

first locking means for locking the first compartment means such that access to the interior surface of the first compartment means from the exterior surface of the same is selectively prevented except with a proper key means for securing and unsecuring the first locking means;

second compartment means for holding articles, the second compartment means capable of securely holding at least one assembled rifle having a length of at least three feet and a height of at least six inches, the second compartment means being located within the interior of the first compartment means; and second locking means for locking the second compartment means against one of the sides of the first compartment means such that the second compartment means is locked within the first compartment means and both the first locking means and the second locking means must be defeated to allow unauthorized access into the second compartment means.

2. A vehicle storage box for holding articles as defined in claim 1 wherein the first compartment means comprises:

a container;

lid means for covering the container, the lid means having a first open position and a second closed position; and wherein the first locking means comprises means for locking the lid means on the container.

3. A vehicle storage box for holding articles as defined in claim 2 wherein the second compartment means comprises tray means for holding an article to be secured therein, the tray means being pivotally connected to the lid means such that the tray means can be releasably pressed against the interior surface of the lid means.

4. A vehicle storage box for holding articles as defined in claim 3 wherein the first locking means further comprises a first lock and a second lock, the first lock and the second lock being positioned on opposing ends of the storage box, and a handle means associated with each of the first and the second locks, the handle means allowing opening of the lid means at either one of the first and second lock means.

5. A vehicle storage box for holding articles as defined in claim 3 wherein the second locking means comprises a first locking device and a second locking device, the first locking device and the second locking device independently securing the second compartment means.

6. A vehicle storage box for holding articles as defined in claim 3 wherein the lid means and the tray means are each provided with a cushioning material.

7. A vehicle storage box for holding articles as defined in claim 1 wherein the second compartment means comprises dimensions at least as great as three feet long and about eight inches wide.

8. A vehicle storage box for holding articles as defined in claim 1 wherein the second compartment means comprises dimensions at least as great as about four feet long and six inches wide.

9. A vehicle storage box for holding articles as defined in claim 1 wherein the second compartment means comprises dimensions at least as great as four feet long and about twelve inches wide.

10. A vehicle storage box for holding articles as defined in claim 1 wherein the key means for securing and unsecuring the first locking means comprises a tumbler cylinder lock.

11. A vehicle storage box for holding articles in a vehicle, the storage box comprising:

first compartment means for holding articles, the first compartment means comprising an interior surface and an exterior surface, the first compartment means comprising:

a container;

lid means for covering the container, the lid means having a first open position and a second closed position; and wherein the first locking means comprises means for locking the lid means on the container;

first locking means for locking the first compartment means such that access to the interior surface of the first compartment means from the exterior surface of the same is selectively prevented, wherein the first locking means further comprises:

a first lock; and a second lock, the first lock and the second lock being positioned on opposing ends of the storage box, and a handle means associated with each of the first and the second locks, the handle means allowing opening of the lid means at either one of the first and second lock means;

second compartment means for holding articles, the second compartment means capable of securely holding at least one assembled rifle having a length of at least three feet and a height of at least six inches, the second compartment means being located within the interior of the first compartment means, the second compartment means comprising:

tray means for holding an article to be secured therein, the tray means being pivotally connected to the lid means such that the tray means can be releasably pressed against the interior surface of the lid means; and second locking means for locking the second compartment means against one of the sides of the first compartment means such that the second compartment means is locked within the first compartment means and both the first locking means and the second locking means must be defeated to allow unauthorized access into the second compartment means.

12. A vehicle storage box for holding articles as defined in claim 11 wherein the second locking means comprises a first locking device and a second locking device, the first locking device and the second locking device independently securing the second compartment means.

13. A vehicle storage box for holding articles as defined in claim 11 wherein the lid means and the tray means are each provided with a cushioning material.

14. A vehicle storage box for holding articles as defined in claim 11 wherein the second compartment means comprises dimensions at least as great as about four feet long and about twelve inches wide.

* * * * *